Patented June 20, 1933

1,915,062

UNITED STATES PATENT OFFICE

HYMAN LIMBURG, OF AMSTERDAM, NETHERLANDS, ASSIGNOR, BY MESNE ASSIGNMENTS, TO THE FLINTKOTE CORPORATION, OF BOSTON, MASSACHUSETTS, A CORPORATION OF MASSACHUSETTS

PROCESS OF PREPARING EMULSIFIABLE PRODUCTS AND EMULSIONS THEREOF

No Drawing. Application filed November 19, 1928, Serial No. 320,546, and in the Netherlands December 15, 1927.

My invention relates to a process of preparing readily emulsifiable petroleum products and emulsions thereof, especially asphalt which can be emulsified in a simple manner.

When petroleum is distilled in the usual way, the residues require varying quantities of an emulsfying agent, depending on their nature and origin and on the intensity of distillation. There are, however, petroleum residues which, with an aqueous solution of caustic soda, emulsify at once, without the addition of any special emulsifier; this is particularly the case with Mexican (Panuco) asphalts of low melting point.

These facts lead to the assumption that the residues from distillation may contain some "natural" emulsifiers, which were already present in the base material, viz. the crude petroleum, and I have found that such is, indeed, the case and, further, that in the usual process of distillation these substances are more or less removed from the residue according to their volatility.

The object of my invention is to apply means whereby the natural emulsifiers are entirely, or for the greater part, retained in the final product. This object is attained by fixing these emulsifiers in some way or other in the base material before distillation, so that they are not removed in the course of the distillation.

The application of the process or method described is rendered possible by the fact that the natural emulsifiers have an acid character, and with non-volatile basic substances are able to form salts which remain in the distillation residue.

The preparation of the easily-emulsifiable petroleum products according to my invention can be carried out in several ways. For example, the non-volatile base can be added to the crude oil itself. According to another method, the basic substance is added to the crude oil after removal of the lighter fractions, e. g., the gasoline and kerosene fractions. Again, the crude oil may first be distilled, whereupon the basic substance is added to the distilled fraction in which the natural emulsifiers are present. It is also evident that a fraction in which natural emulsifiers are present originating from one distillation can be added to the residue from another distillation, after which the basic substance is added.

To the oil which, therefore, may consist of crude oil, so-called "topped" crude oil, a mineral oil fraction, a residue mixed with a fraction of the same or some other distillation, etc., a non-volatile basic substance (for instance, NaOH, KOH, $Na_2SiO_3$, CaO) is added, after which the oil is distilled to the desired degree. In the residue of the distillation the natural emulsifiers may be set free by means of acids such as $H_2SO_4$, HCl and the like. In this case the products obtained may be emulsified in an aqueous solution of an alkali hydroxide, either directly or with the addition of a very small quantity of an emulsifying agent.

The addition of acid may also be dispensed with, the asphalt—in which, therefore, the natural emulsifiers are contained in the form of soaps—being emulsified in water or in an aqueous solution of caustic soda, if necessary with the addition of a small portion of emulsifier; and in the preparation of emulsions according to this method the use of a colloid mill may be desirable. In this case distillation must be carried out after the addition of alkali hydroxide, but not of earth-alkali hydroxide.

As already mentioned, a variant of the process described, which is based on the same principle, is to redistil the fraction containing the natural emulsifiers, the latter first being fixed in the manner aforesaid. In this case a residue is obtained which as a rule is so rich in emulsifiers that—after the emulsifiers have been wholly or partly set free—when mixed with residues containing few or no emulsifiers, it at once produces emulsifiable mixtures.

The emulsions thus obtained may be subjected to any usual treatment. The emulsions can be rendered more stable by the addition of protective substances; they may also be added to the aqueous caustic soda solution before or during the emulsification.

It is apparent that the method of working is not dependent upon the manner of distillation and that it can be applied under all circumstances where there is a danger of the natural emulsifiers evaporating or decomposing, such as is the case in the preparation of blown asphalts.

Example I 100 tons of Venezuelan crude oil are distilled until the benzine, kerosene and lubricating oil fractions are removed. To the 40 tons or so of lubricating oil fraction a quantity of NaOH is added corresponding to the acid value of that fraction, after which the product is redistilled. The residue obtained is treated at an elevated temperature with a quantity of $H_2SO_4$ or HCl equivalent to the amount of NaOH added and subsequently mixed with 100 tons of primary Venezuelan asphalt (melting point Ring and Ball 50° C.), after which the molten mass is emulsified, while being stirred, in 80 tons of a 0.5% NaOH solution.

Example II 100 tons of Mexican crude oil are distilled until the benzine and kerosene fractions are removed. A quantity of NaOH large enough to fix the natural emulsifiers in the residue is then added, after which it is run to asphalt. HCl gas is injected into the hot asphalt until all the NaOH is converted into NaCl, when the asphaltic mass is emulsified in a 0.5% NaOH solution, giving a 60% asphalt-containing emulsion.

I claim as my invention:—

The herein-described process, comprising the steps of distilling crude oil until the benzine, kerosene and lubricating oil fractions are removed, adding a basic substance to the lubricating oil fraction to fix in the latter the natural emulsifier contained therein, distilling the mixture to produce an asphaltic residue, treating the distillation residue with acid to set free the natural emulsifier, adding asphalt having substantially no natural emulsifiers contained therein to the acid-treated residue, and then emulsifying the resultant product in an aqueous caustic soda solution.

In testimony whereof I affix my signature.

HYMAN LIMBURG.